(No Model.)

A. L. FRANCE.
SUPPLEMENTARY LENS FOR BICYCLE OR CARRIAGE LAMPS.

No. 467,227. Patented Jan. 19, 1892.

ATTEST.
J. Henry Kaiser
Joseph C. Stack

INVENTOR.
Albert L. France
By W. Griffith
Attorney

UNITED STATES PATENT OFFICE.

ALBERT L. FRANCE, OF MILLDALE, ASSIGNOR TO THE KENTON CAN COMPANY, OF COVINGTON, KENTUCKY.

SUPPLEMENTARY LENS FOR BICYCLE OR CARRIAGE LAMPS.

SPECIFICATION forming part of Letters Patent No. 467,227, dated January 19, 1892.

Application filed January 12, 1891. Serial No. 377,568. (No model.)

*To all whom it may concern:*

Be it known that I, ALBERT L. FRANCE, of Milldale, Kenton county, and State of Kentucky, have invented certain new and useful Improvements in Supplementary Lenses for Bicycle or Carriage Lamps, of which the following is a full, clear, and exact description, reference being had to the accompanying drawings, and to the letters of reference marked thereon.

My invention relates to an improvement in bicycle or coach lamps, in adding to such lamps a supplementary lens that will increase the brilliancy and splendor of the light evolved, and thereby producing a simple and very serviceable attachment.

With these ends in view my invention will consist in the peculiar features and combinations of parts more fully described hereinafter, and pointed out in the claim.

Figure 1:
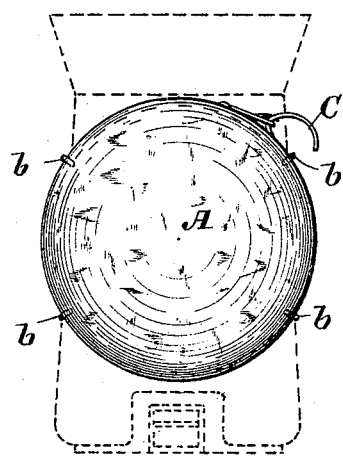
Figure 2:
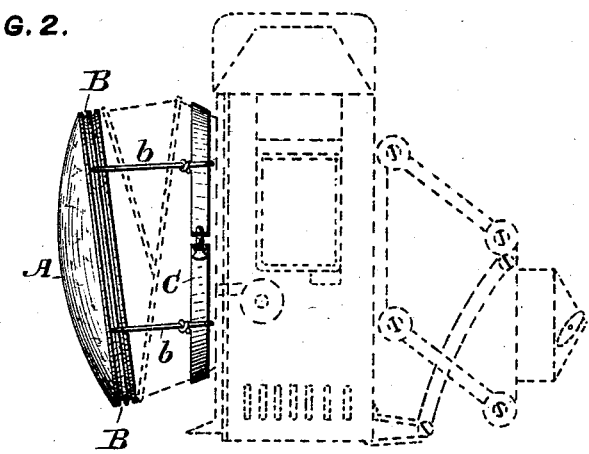

In the accompanying drawings, Figure 1 represents a side elevation of a bicycle-lantern having my supplementary lens attached. Fig. 2 represents a front view of the same.

Similar letters of reference refer to similar parts in both figures, and to make it plain in the drawings my improvement is shown in solid lines and the lantern in dotted lines.

A represents the lens, having a furrow or groove on the center of its edge or periphery. B represents a wire, bound rigidly in said furrow or groove and circumscribing the lens.

$b\ b\ b\ b$ are four wires fastened to the wire B at one end, the other ends having a loop through which the leather strap C passes, and is then fastened by a buckle to the hood of the lantern, thereby attaching in a detachable manner the supplementary lens to the lantern.

Slight changes which might suggest themselves to skilled mechanics could be made without departing from the spirit and scope of my invention. Hence I do not limit myself to the precise construction herein shown for bicycle or carriage lamps.

What I claim is—

The combination of the following elements: the supplementary lens A, having a wire band B circumscribing the same, the wires $b$, each fastened at one end to said band and at the other end having a loop, and the leather strap C, having a buckle and passing through all the loops, substantially as shown and described.

ALBERT L. FRANCE.

Witnesses:
JOHN BICKEL,
MARTIN SCHOPP.